United States Patent Office 3,413,207
Patented Nov. 26, 1968

3,413,207
PROCESS FOR THE MANUFACTURE OF
2,2,3,3-TETRACHLOROBUTANE
Kurt Sennewald, Knapsack, near Cologne, Herbert Baader, Hermulheim, near Cologne, and Helmut Reis, Hurth, near Cologne, Germany, assignors to Knapsack Aktiengesellschaft, Knapsack, near Cologne, Germany, a corporation of Germany
No Drawing. Filed Mar. 29, 1966, Ser. No. 538,191
Claims priority, application Germany, Apr. 24, 1965, K 55,910
4 Claims. (Cl. 204—163)

The present invention relates to a process for the manufacture of 2,2,3,3-tetrachlorobutane.

2,2,3,3-tetrachlorobutane is a valuable starting product for making readily polymerizable 2,3-dichlorobutadiene-(1,3).

It is known that 2,2,3,3-tetrachlorobutane can be obtained by reacting 1,1,1-trichloroethane with catalytically activated hydrogen in the presence of aqueous ammonia. 2,2,3,3-tetrachlorobutane can also be obtained by the additive combination of chlorine with butyne-(2) or 2,3-dichlorobutene-(2).

The preparation of 2,2,3,3-tetrachlorobutane from trichloroethane has the inherent disadvantage of necessitating the rather costly use of catalytically activated hydrogen, and of the hydrogen chloride split off being bound to ammonia. In other words, this process consumes ammonia and hydrogen, and the hydrogen chloride split off undergoes conversion into ammonium chloride, from which it can be recovered with considerable difficulty only. Butyne-(2) enables only very small yields of 2,2,3,3-tetrachlorobutane to be obtained.

The manufacture of 2,2,3,3-tetrachlorobutane from 2,3-dichlorobutene-(2) is an uneconomic procedure as the latter compound is accessible with difficulty only by dehydrochlorination; catalytic dehydrochlorination produces but small yields, whilst the dehydrochlorination by means of a base results in the formation of by-products which are useless in the process.

The difficulties mentioned above can unexpectedly be obviated when, in accordance with the present invention, 2,2,3,3-tetrachlorobutane is prepared from 2,2,3-trichlorobutane direct by substituting chlorine for the hydrogen linked to $C_3$. 2,2,3-trichlorobutane being a compound readily obtainable from butane-(2) by chlorination under radiation with ultraviolet light, the process of the present invention enables henceforth, 2,2,3,-tetrachlorobutane to be readily obtained from butene-(2).

The present invention relates more especially to a process for the manufacture of 2,2,3,3-tetrachlorobutane, wherein liquid 2,2,3-trichlorobutane is reacted with chlorine with exposure to ultraviolet light. A special process feature comprises introducing chlorine gas into liquid, 2,2,3-trichlorobutane at a temperature of —13 to +143° C., preferably of 30 to 50° C., if desired with agitation and cooling, until 2,2,3,3-tetrachlorobutane crystals cease to precipitate and hydrogen chloride ceases to be liberated, separating the tetrachlorobutane crystals by filtration, and recovering further 2,2,3,3-tetrachlorobutane as residue by distilling off 2,2,3-trichlorobutane from the filtrate.

The temperature of —13° C. means the melting point, and the temperature of +143° C. means the boiling point of 2,2,3-trichlorobutane. The chlorine must be activated by means of light because the reaction will otherwise proceed too reluctantly for transformation of the chlorine. Only upon exposure to the action of ultraviolet light of a yellow solution of 2,2,3-trichlorobutane, into which chlorine had been introduced, and after a short induction period, underwent the solution instantaneous discoloration accompanied by the evolution of hydrogen chloride. This gives rise to a temperature increase which indicates that the reaction has started. The chlorination reactor is continuously cooled then in order to dissipate the heat of reaction. The 2,2,3,3-tetrachlorobutane formed during the reaction is substantially obtained in the form of white crystals which can readily be removed from unreacted liquid 2,2,3-trichlorobutane by conventional centrifugation or filtration. The liquid, unreacted 2,2,3,-trichlorobutane can be recycled into the chlorination reactor once dissolved 2,2,3,3-tetrachlorobutane has been removed therefrom by distillation.

It is an unexpected result that the chlorination proceeds selectively because 2,2,3,3-tetrachlorobutane is found to be the compound predominantly formed of all possible tetrachlorobutanes; 1,2,2,3- and 2,2,3,4-tetrachlorobutanes are obtained in the present process in but minor proportions. It is especially noteworthy that the chlorine can be substituted for the hydrogen atom linked to $C_3$ without the substitution being accompanied by appreciable side-reactions, e.g. dehydrochlorination followed by the additive combination of chlorine with the double bonds so formed, which could give rise to the formation of higher-chlorinated products in addition to the above isomers. Attempts made with the object of preparing other tetrachlorobutanes, such as 1,2,3,4-tetrachlorobutane, have shown that this is a very distinct reaction which always results in considerable amounts of isomeric tetrachlorobutanes being formed.

The same applies to attempts made with the object of preparing 2,2,3,3-tetrachlorobutane by the additive combination of chlorine with butyne-(2), which was also found to be accompanied by strong dehydrochlorination. It is therefore an unexpected result that no such phenomenon practically accompanies the substitution according to the present invention. The selective course of the chlorination, carried out in accordance with the present invention, also is considerably influenced inter alia by the relatively poor solubility of solid 2,2,3,3-tetrachlorobutane in liquid 2,2,3-trichlorobutane. 2,2,3,3-tetrachlorobutane already formed, which precipitates, obviously escapes further action of the chlorine due to such precipitation. It could not be foreseen that the poor solubility of 2,2,3,3-tetrachlorobutane in the solution of 2,2,3-trichlorobutane, chlorine and hydrogen chloride would produce such effect, but certainly this effect is not critical alone as a portion of the 2,2,3,3-tetrachlorobutane remains in the solution.

From a technical point of view, the synthesis of 2,2,3,3-tetrachlorobutane as taught in the present invention offers considerable advantages over earlier methods. More especially, 2,2,3,3-tetrachlorobutane can be obtained from butene-(2) which can directly be transformed by known methods into 2,2,3-trichlorobutane. The hydrogen chloride being split off upon the substitution is obtained as a rather pure gas, and it can be re-used in other processes. After transformation into chlorine by conventional means, it can also be re-used in the present process.

EXAMPLE 509 grams (2.97 mols) 2,2,3-trichlorobutane were placed into a 1 liter glass flask provided with agitator, thermometer, chlorine inlet tube, hydrogen chloride outlet tube, and ultraviolet lamp with a burner of 70 watts.

The solution turned yellow when the chlorine was introduced. After a short time, the reaction set in under the action of the ultraviolet light. This was accompanied by evolution of hydrogen chloride and temperature increase. At the same time, the solution underwent discoloration. The temperature prevailing inside the flask was maintained at 30 to 50° C. by cooling with ice water.

271 grams 2,2,3,3-tetrachlorobutane in the form of white crystals were obtained within 3 hours (melting point: 174° C. in the sealed tube). They were removed by suction. The filtrate was subjected to distillation. 181 grams unreacted 2,2,3-trichlorobutane were recovered as the main fraction. A further 36.5 grams 2,2,3,3-tetrachlorobutane remained as the residue. The 2,2,3,3-tetrachlorobutane was obtained in a yield of 78%, referred to the 2,3,3-trichlorobutane of which 64.5% underwent conversion.

We claim:

1. A process for the manufacture of 2,2,3,3-tetrachlorobutane which comprises reacting liquid 2,2,3-trichlorobutane with chlorine under radiation with ultraviolet light.

2. A process as claimed in claim 1, which comprises introducing chlorine gas into liquid 2,2,3-trichlorobutane, at a temperature of −13 to +143° C., until 2,2,3,3-tetrachlorobutane crystals cease to precipitate and until hydrogen chloride ceases to be liberated, separating the said tetrachlorobutane crystals by filtration, and recovering further 2,2,3,3-tetrachlorobutane as residue by distilling off 2,2,3-trichlorobutane from the filtrate.

3. A process as claimed in claim 2, wherein the chlorination is carried out with agitation and cooling.

4. A process as claimed in claim 2, wherein the chlorination is carried out at a temperature of 30 to 50° C.

References Cited

UNITED STATES PATENTS

| | | | |
|---|---|---|---|
| 2,459,767 | 1/1949 | Calfee et al. | 204—163 |
| 2,571,901 | 10/1951 | Lawlor | 204—163 |

HOWARD S. WILLIAMS, *Primary Examiner.*